(12) United States Patent
Parlin

(10) Patent No.: US 10,316,646 B2
(45) Date of Patent: Jun. 11, 2019

(54) POSITION TRACKING FOR PROPPANT CONVEYING STRINGS

(71) Applicant: Halliburton Energy Services, Inc., Houston, TX (US)

(72) Inventor: Joseph DeWitt Parlin, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 89 days.

(21) Appl. No.: 15/555,065

(22) PCT Filed: Jun. 30, 2015

(86) PCT No.: PCT/US2015/038519
§ 371 (c)(1),
(2) Date: Aug. 31, 2017

(87) PCT Pub. No.: WO2017/003450
PCT Pub. Date: Jan. 5, 2017

(65) Prior Publication Data
US 2018/0045036 A1 Feb. 15, 2018

(51) Int. Cl.
*E21B 47/09* (2012.01)
*E21B 43/04* (2006.01)
(Continued)

(52) U.S. Cl.
CPC ............ *E21B 47/09* (2013.01); *E21B 43/045* (2013.01); *E21B 43/267* (2013.01); *E21B 47/04* (2013.01);
(Continued)

(58) Field of Classification Search
CPC .................. E21B 34/14; E21B 47/0905; E21B 2034/007; E21B 47/09; E21B 43/04; E21B 43/045
See application file for complete search history.

(56) References Cited

U.S. PATENT DOCUMENTS 2,476,137 A * 7/1949 Henri-Georges ..... E21B 43/119
102/313
6,048,175 A 4/2000 Corlew et al.
(Continued)

FOREIGN PATENT DOCUMENTS

KR 10-2013-0076772 7/2013

OTHER PUBLICATIONS

International Search Report and Written Opinion from PCT/US2015/038519, dated Mar. 18, 2016, 10 pages.
(Continued)

*Primary Examiner* — Kipp C Wallace
(74) *Attorney, Agent, or Firm* — McGuireWoods LLP

(57) ABSTRACT

A well system can include a completion string adjacent to a target formation and a service tool extending within the completion string. When the service tool is in an aligned position with respect to the completion string, the service tool can prevent fluid communication between the target formation and a return conduit to facilitate fluid slurry injection. In such an alignment, a reader of the service tool is positioned within a threshold distance of a tag of the completion string to receive an indicator from the tag. From the tag, the reader receives confirmation that the service tool and the completion string are properly aligned. A pulser of the service tool transmits a signal to a surface location to convey the confirmation. A user may then pump the fluid slurry through an internal fluid flow passage of the service tool to the target formation.

20 Claims, 11 Drawing Sheets

(51) Int. Cl.
- *E21B 43/267* (2006.01)
- *E21B 47/04* (2012.01)
- *E21B 47/18* (2012.01)
- *G06K 7/10* (2006.01)
- *E21B 43/08* (2006.01)
- *E21B 47/00* (2012.01)
- *E21B 34/00* (2006.01)

(52) U.S. Cl.
CPC .......... *E21B 47/18* (2013.01); *G06K 7/10376* (2013.01); *E21B 43/08* (2013.01); *E21B 47/00* (2013.01); *E21B 2034/007* (2013.01)

(56) References Cited

U.S. PATENT DOCUMENTS

| | | | |
|---|---|---|---|
| 8,511,380 | B2 | 8/2013 | Guignard et al. |
| 8,528,641 | B2 | 9/2013 | Clem et al. |
| 8,596,359 | B2 | 12/2013 | Grigsby et al. |
| 8,820,416 | B2* | 9/2014 | Holderman ............. E21B 23/04 166/373 |
| 2002/0170749 | A1 | 11/2002 | Hoyer et al. |
| 2009/0294124 | A1* | 12/2009 | Patel ....................... E21B 23/02 166/255.2 |
| 2010/0089587 | A1* | 4/2010 | Stout ....................... E21B 23/04 166/319 |
| 2012/0043079 | A1* | 2/2012 | Wassouf ................. E21B 31/00 166/250.01 |
| 2013/0118752 | A1 | 5/2013 | Hannegan et al. |
| 2013/0292110 | A1 | 11/2013 | Fraser et al. |
| 2014/0110169 | A1 | 4/2014 | Santos et al. |
| 2014/0124198 | A1* | 5/2014 | Donovan ............. E21B 41/0035 166/255.1 |
| 2014/0239959 | A1* | 8/2014 | Clarkson .................. G01V 3/10 324/338 |
| 2015/0176369 | A1* | 6/2015 | Nguyen ................ E21B 34/066 166/308.1 |

OTHER PUBLICATIONS

"Enhanced Single-Trip Multizone (ESTMZ) System," 2014, Halliburton, 6 pages.

"Downhole Sand Control Components," Dec. 2013, Halliburton Sand Control Catalog, Section 3,58 pages.

"Weight-Down Sand Control Completion System," Juy 2015, Halliburton, 4 pages.

"Multi-Position Gravel Pack System," Jul. 2008, Halliburton, 2 pages.

* cited by examiner

POSITION TRACKING FOR PROPPANT CONVEYING STRINGS

BACKGROUND

In the oil and gas industry, particulate materials such as sand and other wellbore debris are often produced to the surface during the extraction of hydrocarbons from a well traversing unconsolidated or loosely consolidated subterranean formations. Producing such particulate matter can cause abrasive wear to components within the well, such as tubing, pumps, and valves, and can sometimes partially or fully clog the well creating the need for an expensive workover operation. Also, if the particulate matter is produced to the surface, it must be removed from the extracted hydrocarbons by various processing equipment at the surface.

In order to prevent the production of such particulate material to the surface, unconsolidated or loosely consolidated production intervals in the well are often gravel packed. In a typical gravel pack completion, a completion string including a packer, a circulation valve, a fluid loss control device and one or more sand control screens, is lowered into the wellbore to a position proximate the desired production interval. A service tool is then positioned within the completion string and a fluid slurry that includes a liquid carrier and a particulate material (i.e., gravel) is then pumped through the circulation valve and into the well annulus formed between the sand control screens and the perforated well casing or open hole production zone. The liquid carrier either flows into the adjacent formation or returns to the surface by flowing through the sand control screens, or both. In either case, the gravel is deposited around the sand control screens to form a gravel pack, which is highly permeable to the flow of hydrocarbon fluids but simultaneously blocks the flow of the particulate material often carried in the hydrocarbon fluids. As such, gravel packs can successfully prevent the problems associated with the production of particulate materials from the formation.

When pumping proppant through tools in high volumes, such as is required for fractured sand control applications (i.e., "frac pac"), proper positioning of a tool string relative to seal bores, ports, and valves is required to allow flow to divert in a proper direction. Undesirable flow diversion can lead to erosion of tools by flow of the proppant. In some instances, the tool string may become packed off, which can lead to lost or damaged tools or additional operations to attempt removal of the tools and proppant to recover the wellbore.

Traditionally, the location of tool strings is controlled by weight, by setting down against shoulders or smaller inner diameters with larger outer diameter tools, or by using devices such as collets to engage profiles to position tool strings. In deep and/or highly deviated wells, especially those where multiple zones are to be treated with a single work string, relying upon weight and pipe tally to know exactly where the tool string is positioned can be difficult. In such wells, pipe stretch and buckling prevent accurate position determinations.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

This present disclosure is related to the treatment of subterranean production intervals and, more particularly, to positioning and alignment of a work string and service tool relative to seal bores, ports, and valves of a completion string for further operations during a well treatment operation.

The embodiments disclosed herein provide feedback indicators to guide positioning and alignment of a tool string with respect to a collar of a completion string. As an operating unit on a work string becomes aligned with an indicator collar of the completion string, modules of the work string communicate with or otherwise identify modules of the indicator collar to determine proximity of the operating unit with respect to the indicator collar. When within a given proximity, a pulser of the work string can communicate with a system at the surface to provide information regarding the proximity and thereby signal that the tool string is at the proper depth for pumping proppant downhole or reversing proppant out of the wellbore. This allows a user to controllably commence operations based on a positive feedback indication of tool string position. Such feedback can be provided alone or in conjunction with the weight methods described herein. The pulser can be provided at an annulus that does not impede or restrict a volume of proppant or a rate of proppant pumped down hole.

Figure 1:
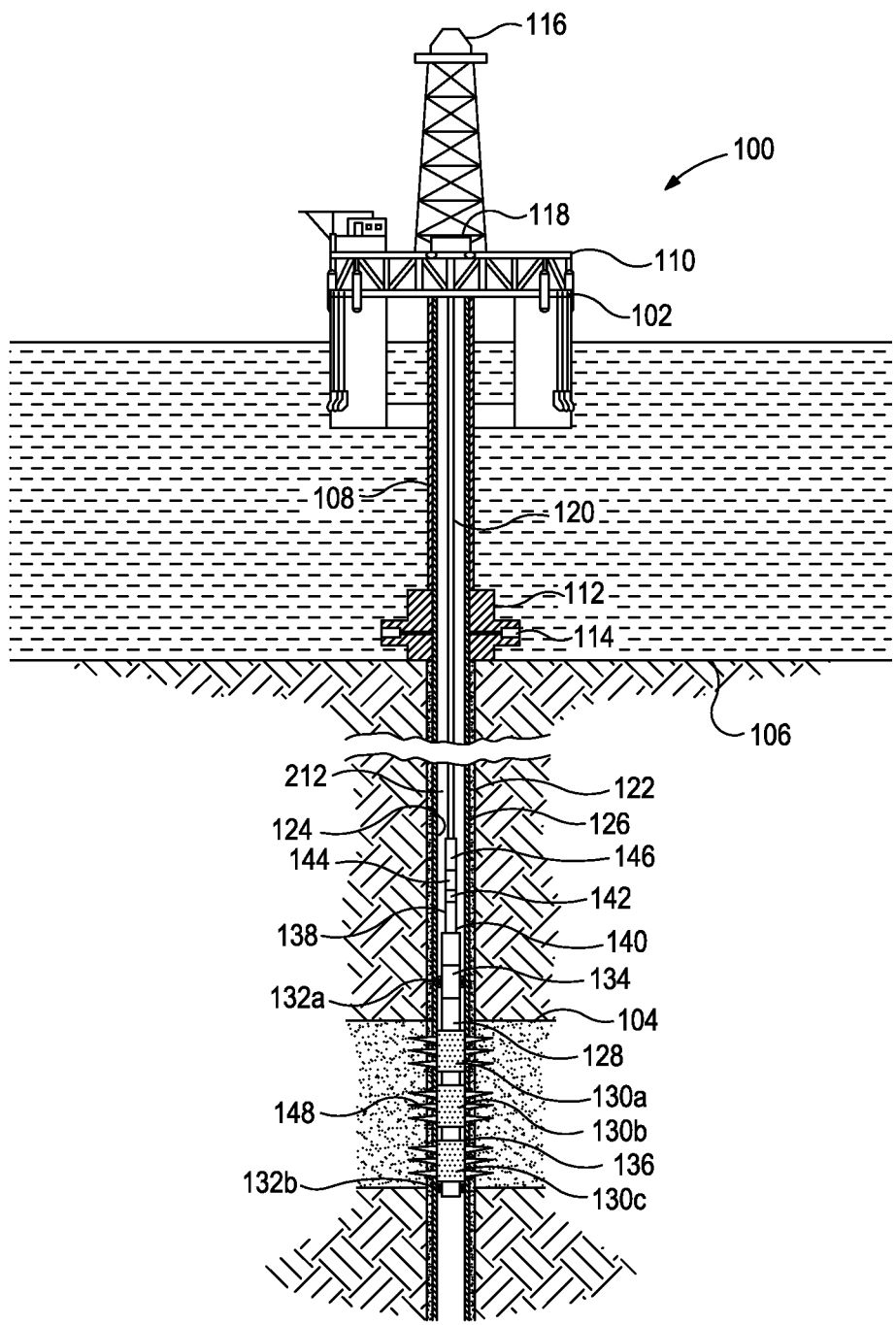
FIG. 1 illustrates an exemplary well system that employs one or more principles of the present disclosure.

Referring to FIG. 1, illustrated is an exemplary well system 100 that may employ one or more principles of the present disclosure, according to one or more embodiments. As illustrated, the well system 100 may include an offshore oil and gas platform 102 located above a submerged hydrocarbon-bearing formation 104 located below the sea floor 106. A subsea conduit or riser 108 extends from a deck 110 of the platform 102 to a wellhead installation 112 that may include one or more blowout preventers 114. The platform 102 may include a derrick 116 and a hoisting apparatus 118 for raising and lowering pipe strings, such as a work string 120. While the system 100 depicts the use of the offshore platform 102, it will be appreciated that the principles of the present disclosure are equally applicable to other types of oil and gas rigs, such as land-based drilling and production rigs, service rigs, and other oil and gas rigs located at any geographical location.

A wellbore 122 extends from the wellhead installation 112 and through various earth strata, including the formation 104. Casing 124 may be cemented within at least a portion of the wellbore 122 using cement 126. A completion string 128 is depicted in FIG. 1 as being installed within the casing 124 and may include one or more sand control devices, such as sand screens 130a, 130b, and 130c positioned adjacent the formation 104 between packers 132a and 132h. In some embodiments, the upper packer 132a may be part of a circulating valve 134.

When it is desired to gravel pack the annulus 136 defined about the sand control screens 130a-c, the work string 120 may be lowered through the casing 124 and at least partially into the completion string 128. The work string 120 may include a service tool 138 having a wash pipe 140, a reverse-out valve 142, a crossover tool 144, a setting tool 146, and other downhole tools known to those skilled in the art. Once the service tool 138 is properly positioned within the completion string 128, the service tool 138 may be operated through its various positions to assure proper operation of the service tool 138. As illustrated, portions of the casing 124 and the wellbore 122 have been perforated to provide one or more perforations 148 that extend a distance into the surrounding formation 104 and provide fluid conductivity between the formation 104 and the annulus 136.

Even though FIG. 1 depicts a vertical well, it will be appreciated by those skilled in the art that the principles of the present disclosure are equally well suited for use in deviated wells, inclined wells, or horizontal wells. Also, even though FIG. 1 depicts a cased wellbore 122, those skilled in the art will readily appreciate that the principles of the present disclosure are equally well suited for use in open-hole completions. Additionally, even though FIG. 1 has been described with reference to a gravel packing operation, including a squeeze (i.e., racking) operation, it should be noted by one skilled in the art that the principles of the present disclosure are equally well-suited for use in a variety of treatment operations where it is desirable to selectively allow and prevent circulation of fluids through a service tool 138. Such operations can include, for example, stage cementing, selective stimulation, fracturing, re-stimulation, and/or re-fracturing of specific zones.

Figure 2A:
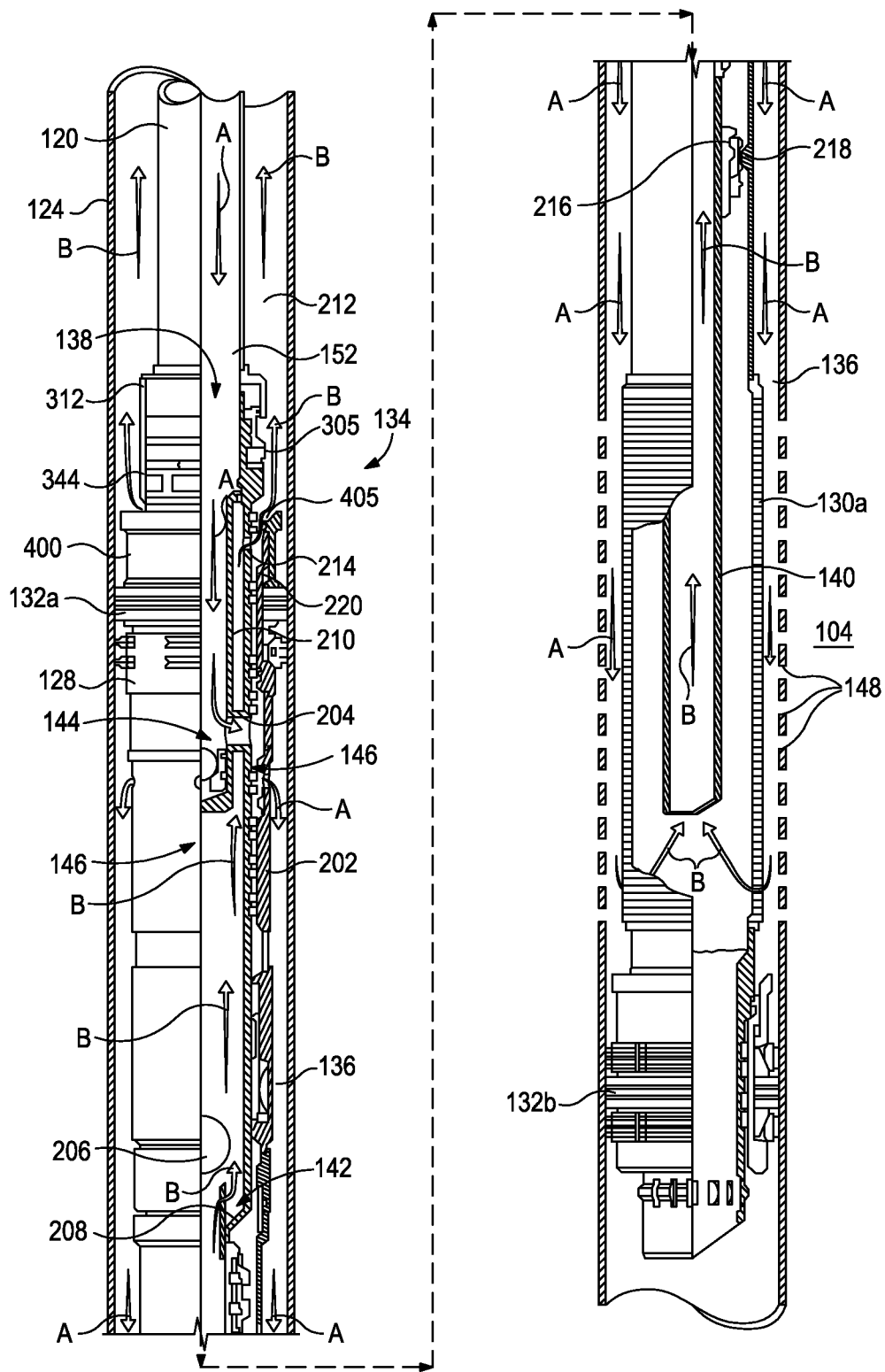
FIG. 2A illustrates a partial cross-sectional side view of the service tool of FIG. 1 positioned within the completion string of FIG. 1.

Referring now to FIGS. 2A-3B, with continued reference to FIG. 1, illustrated are partial cross-sectional side views of the service tool 138 positioned within the completion string 128, according to one or more embodiments. More particularly, FIGS. 2A, 2B, 2C, and 2D depict successive axial sections of the service tool 138 and the completion string 128 while the service tool 138 is operated and otherwise axially manipulated relative to portions of the completion string 128. In FIG. 2A, the service tool 138 is depicted in a circulating position, in FIG. 2B the service tool 138 is depicted in a squeeze position, and in FIG. 2C the service tool 138 is depicted in a reverse-out position. FIG. 2D depicts hydrocarbon production following removal of the service tool 138. It should be noted that only one sand screen 130a is depicted for illustrative purposes in describing the features of the present disclosure. Those skilled in the art, however, will readily appreciate that more than one sand screen 130 (i.e., each of the sand screens 130a-c of FIG. 1) may be used, without departing from the scope of the disclosure.

Referring first to FIG. 2A, a fluid slurry including a liquid carrier and a particulate material such as sand, gravel and/or proppants is pumped down the work string 120 to the service tool 138, as indicated by the arrows A, in order to undertake circulation operations. Once reaching the service tool 138, the fluid slurry A is able to exit the service tool 138 and enter the annulus 136 via the circulating valve 134. More particularly, a circulating sleeve 202 of the circulating valve 134 is depicted in its open position, thereby allowing the fluid slurry A to exit the crossover tool 144 via one or more circulation ports 204 provided by the crossover tool 144. As the fluid slurry A enters the annulus 136, at least a portion of the gravel in the fluid slurry is deposited within the annulus 136. Some of the liquid carrier and proppants, however, may enter the surrounding formation 104 through the one or more perforations 148 formed in the casing 124 and extending into the formation.

The remainder of the fluid carrier re-enters the service tool 138 via the sand control screen 130a, as indicated by arrows B. The fluid carrier B then enters the wash pipe 140 and is conveyed upward towards the reverse-out valve 142. As described in greater detail below, the reverse-out valve 142 may include a ball check 206 that, when the service tool 138 is in the circulating position, may be moved off a valve seat 208 such that the fluid carrier B may flow thereby and toward the crossover tool 144. At the crossover tool 144, the fluid carrier B may be conveyed to and through a return conduit 210 in fluid communication with the annulus 212 defined between the work string 120 and the wellbore 122 (FIG. 1) above the upper packer 132a via one or more return ports 214. After flowing out of the completion string 128 via the return ports 214, the fluid carrier B may return to the surface via the annulus 212. In the circulation position, the fluid slurry A is continuously pumped down the work string 120 until the annulus 136 around the sand control screen 130a is sufficiently filled with gravel, and the fluid carrier B is continuously returned to the surface via the annulus 212 for rehabilitation and recycling.

Figure 2B:
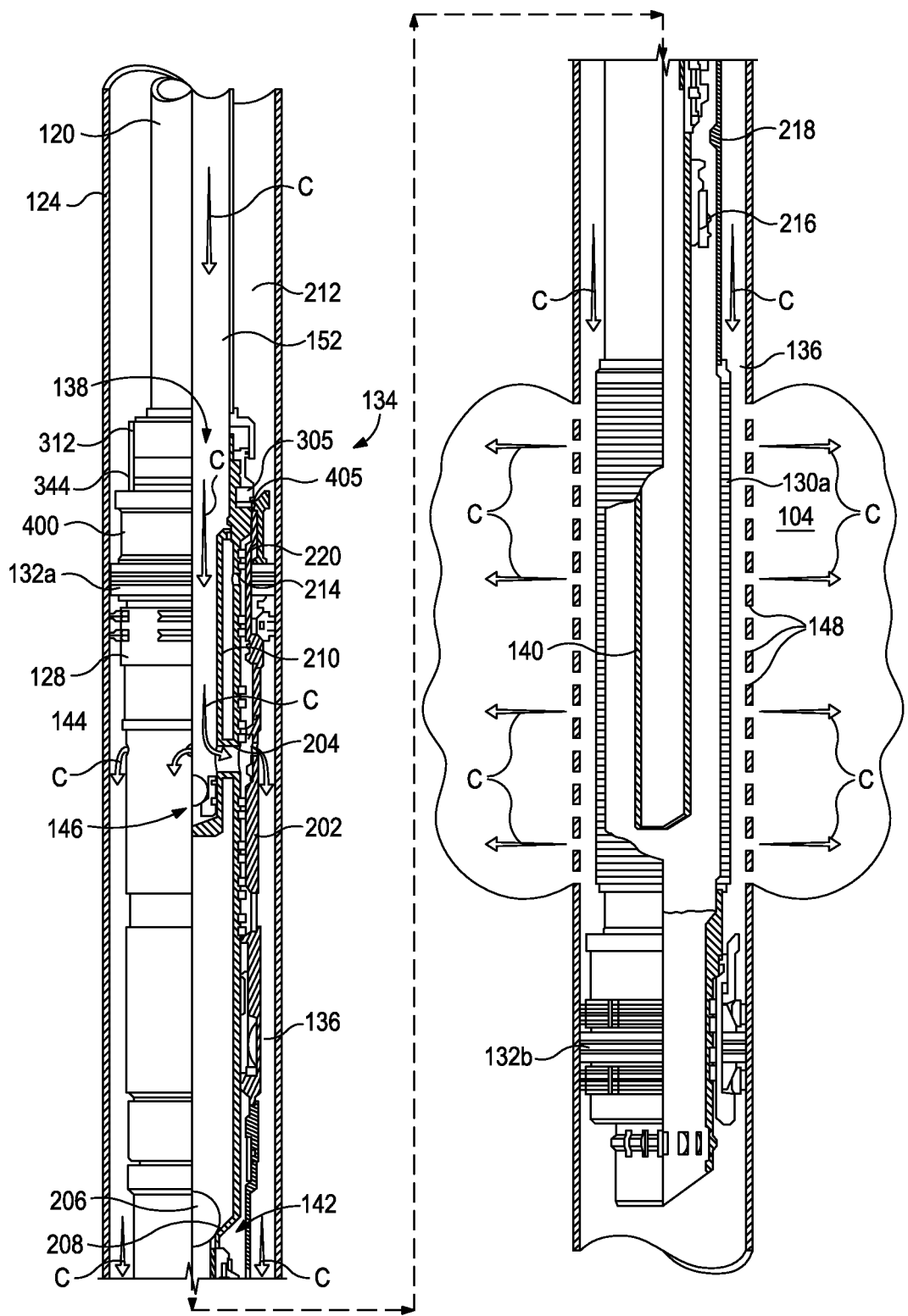
FIG. 2B illustrates a partial cross-sectional side view of the service tool of FIG. 1 positioned within the completion string of FIG. 1.

In FIG. 2B, the service tool 138 has been moved axially with respect to the completion string 128 to the squeeze position. This may be accomplished by axially moving the service tool 138 relative to the completion string 128 until an operating unit 344 of the service tool 138 is aligned with an indicator collar 400 of the completion string 128. Sensing, communication, and/or operation by the operating unit 344 and/or the indicator collar 400 can provide information regarding their relative positions.

Once the service tool 138 is properly aligned with the completion string 128, additional fluid slurry or another treatment fluid may then be pumped down the work string 120 and to the service tool 138, as indicated by the arrows C (FIG. 2B). Once in the service tool 138, the fluid slurry C may again pass through the crossover tool 144 and the circulating valve 134 via the circulation ports 204 and finally into the annulus 136 where the fluid slurry C enters the perforations 148 and serves to hydraulically fracture the formation 104. Since the return ports 214 are occluded by the seal 220 inside the packer mandrel, no return fluids enter the wash pipe 140 and flow towards the reverse-out valve 142. As a result, the ball check 206 is able to sit idly against the valve seat 208 using, for instance, gravitational forces acting thereon.

According to one or more embodiments, the service tool 138 and the indicator collar 400 can have structural or physical profiles that facilitate engagement between the two. Referring again to FIG. 2B, for example, an engagement portion 305 defined on the service tool 138 may be configured to locate and engage a collet 405 provided on the indicator collar 400. The engagement portion 305 and the collet 405 can have complementary profiles, such that axial alignment of the engagement portion 305 relative to the collet 405 results in mechanical actuation of the collet 405. The axial alignment of the engagement portion 305 relative to the collet 405 can correspond to a flow arrangement that allows fluid slurry to enter the annulus 136 where the fluid slurry C enters the perforations 148 and serves to hydraulically fracture the formation 104, as discussed further herein.

Figure 2C:
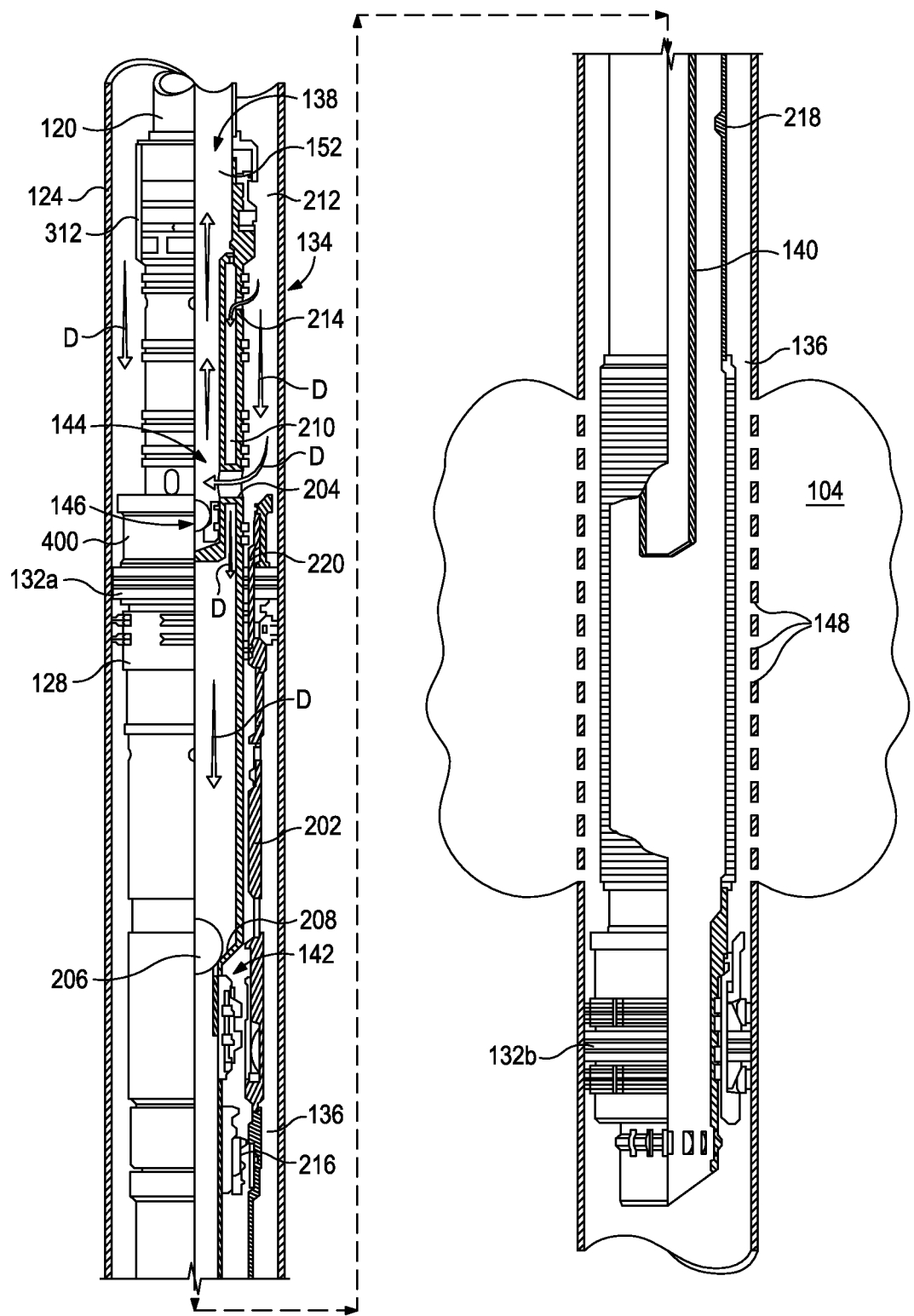
FIG. 2C illustrates a partial cross-sectional side view of the service tool of FIG. 1 positioned within the completion string of FIG. 1.

In FIG. 2C, the service tool 138 has been moved into the reverse-out position to once again allow fluid returns to the surface. To accomplish this, the work string 120 and the service tool 138 are moved upwards with respect to the completion string 128, thereby exposing the return ports 214 and the circulation ports 204 to the annulus 212. In this configuration, a completion fluid may be pumped down the annulus 212 and into the service tool 138 through the crossover tool 144, as indicated by the arrows D. The completion fluid D flows into the work string 120 and returns to the surface via the work string 120 in order to reverse-out any gravel, proppant, or fluids that may remain within the work string 120.

During this process, a portion of the completion fluid D may also fluidly communicate with the reverse-out valve 142. More particularly, a portion of the completion fluid may enter the return conduit 210 via the return ports 214 and be conveyed toward the reverse-out valve 142 via the crossover tool 144. The fluid pressure exhibited by the completion fluid D forces the ball check 206 to seal against the valve seat 208, thereby creating a hard bottom that prevents the completion fluid D from traveling further downhole past the reverse-out valve 142. As will be discussed below, however, the ball check 206 may be configured to allow a metered amount of completion fluid D to pass therethrough in order to maintain hydrostatic pressure on the formation 104 via the wash pipe 140 and the sand screen 130a. As will be appreciated, allowing a metered amount of completion fluid D to pass through the reverse-out valve 142 prevents swabbing of the formation 104 even if the reverse-out valve 142 is moved upwardly relative to the completion string 128.

Figure 2D:
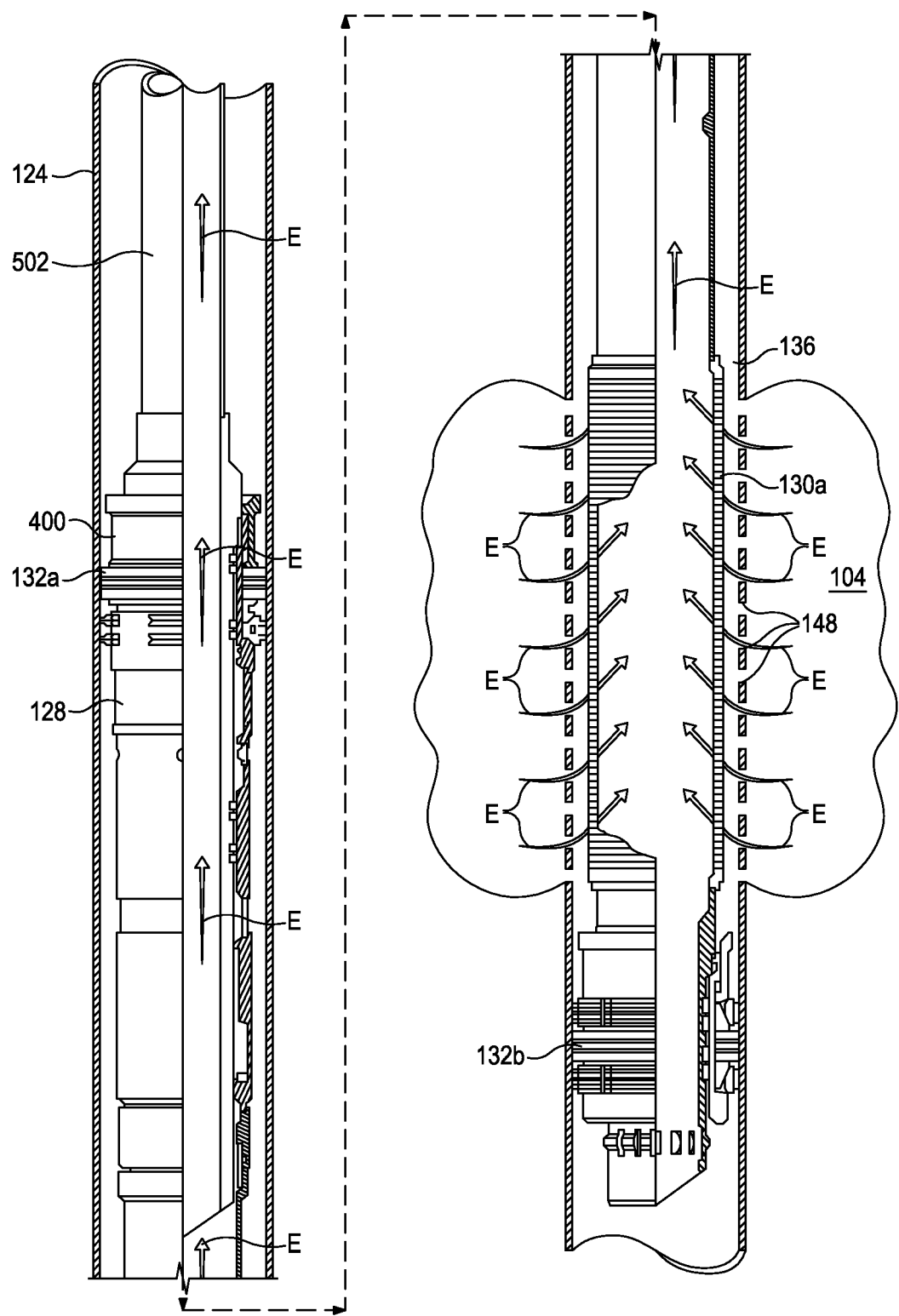
FIG. 2D illustrates a partial cross-sectional side view of the completion string of FIG. 1 after removal of the service tool.

In FIG. 2D, the service tool 138 has been removed from the completion string 128 and returned to the surface. In its place, production tubing 502 has been stung into and otherwise operatively coupled to the completion string 128. At this point, hydrocarbons may be produced from the formation 104, through the sand screen 130a, and conveyed to the surface via the production tubing 502, as indicated by arrows E.

Figure 3A:
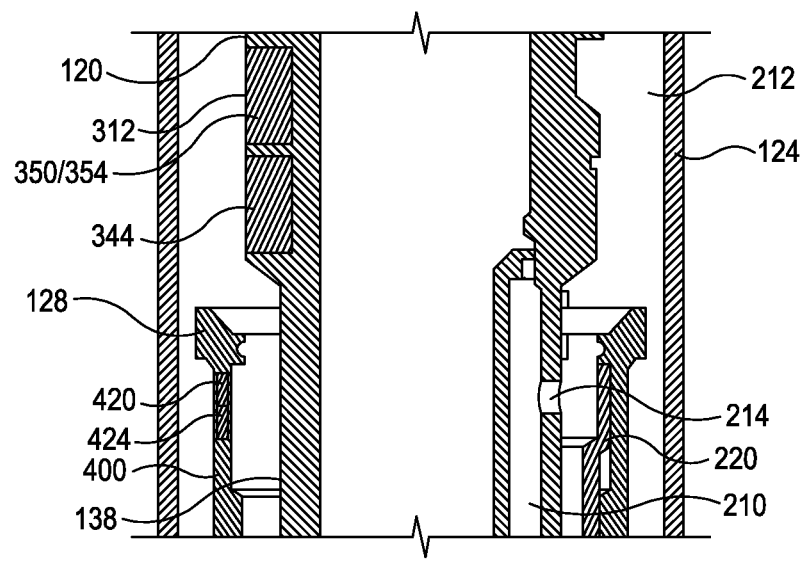
FIG. 3A illustrates an enlarged view of a portion of the service tool of FIG. 1.

Referring now to FIG. 3A, the indicator collar 400 can be arranged about or otherwise form an integral part of the completion string 128. Moreover, however, the indicator collar 400 can be embedded with various electronic and/or mechanical devices configured to provide the indicator collar 400 with intelligence and communication capabilities. For instance, the indicator collar 400 may include one or more sensor modules 420 (one shown) arranged within a cavity defined in the indicator collar 400. While only one sensor module 420 is shown in FIG. 3A, it will be appreciated that more than one sensor module 420 can be employed in the indicator collar 400, without departing from the scope of the disclosure. According to one or more embodiments, for example, several sensor modules 420 can be arranged within the cavity. In other embodiments, multiple sensor modules 420 can be arranged about the circumference of the indicator collar 400, as will be described in detail below.

The sensor module 420 can be configured to monitor or otherwise measure parameters of the service tool 138, such as the presence, absence, or proximity of the service tool 138 and/or a signal transmitted by and/or from the service tool 138. Accordingly, the sensor module 420 may include a variety of different sensors including, but not limited to, antennae, electric field proximity sensors, magnetic field sensors, proximity sensors, pressure sensors, one or more strain gauges or sensors (i.e., to measure weight, tension, compression, bending moment, etc.), chemical composition sensors (e.g., sensors capable of determining the chemical makeup of fluids and otherwise capable of comparing chemical compositions of different fluids), sonic emitters and receivers, resistivity sensors, sonic or acoustic sensors, self/spontaneous potential sensors, mechanical sensors (e.g., caliper logs and the like), and the like.

Referring again to FIG. 3A, a completion string communications module 424 may also be arranged within the cavity of the indicator collar 400. The completion string communications module 424 may include one or more of a receiver, a transmitter, a transceiver, a power source, a computer, and a memory storage device. According to one or more embodiments, the memory storage device can be sealed or substantially sealed (e.g., one or more fluid and/or pressure barriers) from the fluids from the surrounding environment in order to protect fragile electrical components associated therewith. The completion string communications module 424 can be configured to receive data and measurement signals obtained from the sensor modules 420 in real-time, which may prompt the completion string communications module 424 to transmit identifying information to the service tool 138, as will be discussed in more detail below. The identifying information can include or represent a unique profile of the indicator collar 400.

Figure 3B:
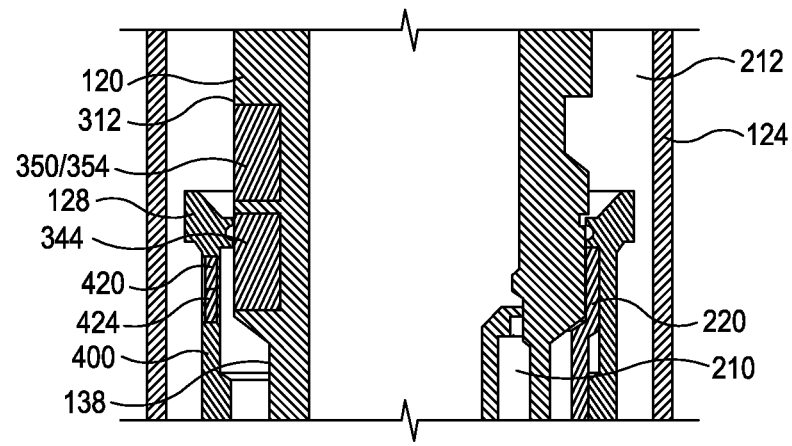
FIG. 3B illustrates an enlarged view of a portion of the service tool of FIG. 1.

Referring now to FIG. 3B, the service tool 138 can be positioned within the completion string 128 such that the operating unit 344 is arranged within a threshold distance from the indicator collar 400. The indicator collar 400 can be communicably coupled to the service tool 138 such that it is able to at least temporarily transmit and/or receive signals. According to one or more embodiments, the indicator collar 400 is communicatively coupled to the service tool 138 by a wireless connection when within the threshold distance. The wireless connection can be initiated by proximity of the service tool 138 relative to the indicator collar 400 (e.g., the threshold distance). Within a duration of the wireless connection, the service tool 138 may trigger an activity of the indicator collar 400, including transmission of identifying information of the indicator collar 400. Other couplings between the indicator collar 400 and the service tool 138 are contemplated. For instance, the service tool 138 can be mechanically and/or electrically coupled to the interior of the completion string 128, without departing from the scope of the disclosure.

Figure 3C:
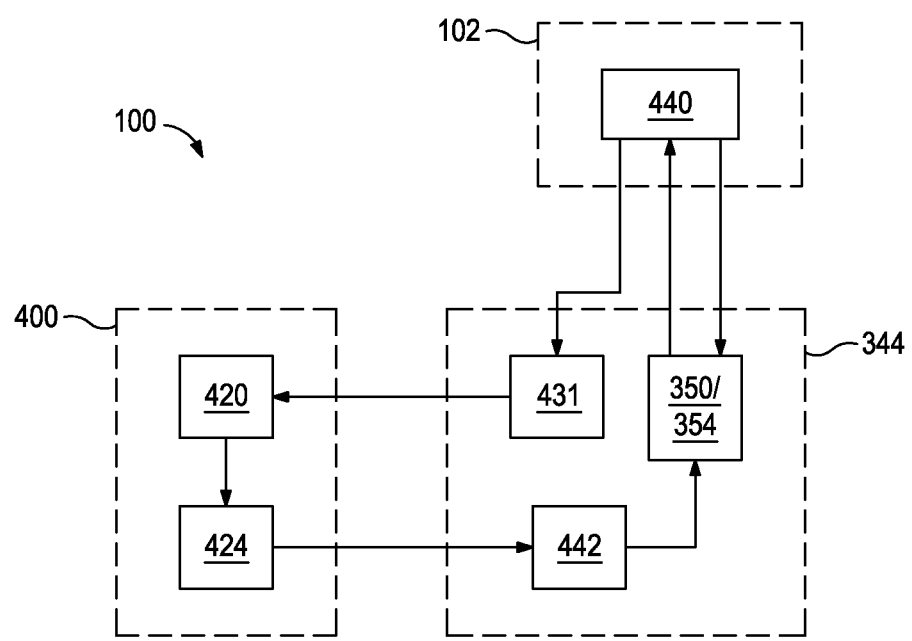
FIG. 3C illustrates a block diagram of components and modules of a well system.

Referring now to FIG. 3C, with continued reference to the preceding figures, illustrated is a block diagram of components and modules of an exemplary well system 100 that may employ the principles of the present disclosure. As shown in FIG. 3C, a communication protocol may include transfer of information and/or energy from the indicator collar 400 to the operating unit 344, and/or from the operating unit 344 to the computer system 440. Optionally, such operations can be preceded by a transfer of information and/or energy from the operating unit 344 to the indicator collar 400. For example, the operating unit 344 can include a transmitting module 431 that can transmit a signal to the sensor module 420 of the indicator collar 400. The operating unit 344 can include a transmitting module 431 that can transmit a signal to the sensor module 420 of the indicator collar 400. The indicator collar 400 can include a completion string communications module 424 that can transmit a signal to the service tool communications module 442 of the operating unit 344. This signal from the transmitting module 431, when received by the sensor module 420, can trigger an activity of the completion string communications module 424, which, in turn transmits a signal to the service tool communications module 442 of the operating unit 344. Alternatively or in combination, the completion string communications module 424 can passively, constantly, or periodically emit information and/or energy for detection by the service tool communications module 442. According to one or more embodiments, operations of the transmitting module 431 and/or the service tool communications module 442 commence upon transmission of a signal from the computer system 440. For example, a signal (e.g., a pressure signal) transmitted by a user at the surface can activate the transmitting module 431 and/or the service tool communications module 442 to commence operation thereof.

According to one or more embodiments, the identifying information transmitted from the completion string communications module 424 to the service tool communications module 442 can be transmitted as a signal having a unique profile corresponding to the identity of the indicator collar 400. This signal can contain identifying information unique to the indicator collar 400. According to one or more embodiments, the operating unit 344 can include one or more transmitting devices (e.g., transmitting devices 350, 354) that can transmit a signal to the computer system 440 of the platform 102. The signal received by the service tool communications module 442 can trigger an activity of the transmitting devices 350,354, which in turn transmits a fluid pressure pulse signal to the computer system 440 of the platform 102 at the surface 404, as discussed further herein. According to one or more embodiments, operations of the transmitting devices 350,354 can cease upon transmission of a signal from the computer system 440. For example, a signal (e.g., a pressure signal) transmitted by a user at the surface can deactivate the transmitting devices 350,354 to cease operation thereof once the signal from the transmitting devices 350,354 has been received.

Identifying information can be transmitted from the completion string communications module 424 to the service tool communications module 442 of the operating unit 344. The service tool communications module 442 may include a variety of different sensing and/or detection mechanisms including, but not limited to, antennae, electric field proximity sensors, magnetic field sensors, proximity sensors, pressure sensors, one or more strain gauges or sensors (i.e., to measure weight, tension, compression, bending moment, etc.), chemical composition sensors (e.g., sensors capable of determining the chemical makeup of fluids and otherwise capable of comparing chemical compositions of different fluids), sonic emitters and receivers, resistivity sensors, sonic or acoustic sensors, self/spontaneous potential sensors, mechanical sensors (e.g., caliper logs and the like), and the like.

The profile of the signal corresponding to the identity of the indicator collar 400 can be an electromagnetic profile that is detected by the service tool communications module 442. In some embodiments, the electromagnetic profile can include or otherwise be facilitated by a magnet or a pattern of magnets, a radiation-emitting device, a mechanical engagement, or an equivalent profile that corresponds to the identity and/or location of the indicator collar 400 from which the signal is transmitted.

In other embodiments, however, the electromagnetic profile can operate based on radio frequency identification ("RFID") technology and the use of one or more RFID tags. Briefly, RFID technology employs electromagnetic energy to remotely read an electronic RFID tag placed on a body or device in order to identify the body or device. The information that is read by a corresponding RFID "reader" can be of any desired type for which a particular implementation is adapted (e.g., an indication that the RFID tag is present, a unique identity code, or several kilobytes of information). As used herein, the electromagnetic signal that is transmitted or otherwise conveyed between the RFID tag(s) and RFID reader(s) includes any electromagnetic emission intended to cause the RFID reader to respond or otherwise act. As will be appreciated, this includes, for example, the mere presence of an electromagnetic field and/or a discrete encoded electromagnetic transmission.

According to one or more embodiments, the completion string communications module 424 can include one or more RFID tags configured to communicate with one or more RFID readers of the service tool communications module 442. Alternatively, the completion string communications module 424 may include the RFID reader(s) and the service tool communications module 442 may include the RFID tag(s), without departing from the scope of the disclosure. As illustrated, the RFID tags can be coupled or otherwise attached to the indicator collar 400, and the RFID readers can be coupled or otherwise attached to the service tool 138. According to one or more embodiments, each of the RFID tags and RFID readers can be encased within a corresponding housing or the like in order to provide protection from external contamination or damage. According to one or more embodiments, one or more of the RFID tags and/or RFID readers can be arranged in a recessed pocket. In such embodiments, the RFID tags and/or RFID readers may have a sealant or other material disposed thereon in order to provide a degree of protection from external contamination and/or damage. Exemplary materials that can be used to seal and protect the RFID tags and/or RFID readers include, but are not limited to, silicones, epoxies, plastics, rubbers, elastomers, cements, polyurethane, chlorinated polyethylene, thermoplastic polymers, non-soluble acrylic polymers, combinations thereof, and the like.

The RFID tags and corresponding technology can be of any type or design known to those skilled in the art. According to one or more embodiments, for example, the RFID tags can be active, semi-active, or battery assisted passive ("BAP"). In other embodiments, however, one or more of the RFID tags can be passive. Passive tags do not require a battery to operate and, therefore, are cheaper and smaller than other types of RFID tags. Passive tags instead contain an electromagnetic or electronic coil that can be excited by a particular frequency of electromagnetic energy transmitted from a transmitting module 431 that includes an RFID reader onboard the operating unit 344 of the service tool 138. The electromagnetic energy transmitted from the transmitting module 431 of the RFID reader to the coil in the RFID tag of the completion string communications module 424 momentarily excites it (i.e., causes energizing or activating electrical current flow), causing an internal electrical circuit to transmit the contents of its buffer, such as some pre-stored value unique to that particular object, back to the RFID reader. The RFID reader senses and reads the transmission from the RFID tag and in response may undertake some predetermined action.

Still referring to FIG. 3C, the service tool communications module 442 can be directly communicably coupled to the transmitting devices 350,354. Activating or exciting RFID readers of the service tool communications module 442 may trigger operation of the transmitting devices 350, 354, which may result in the transmission of a signal to the computer system 440 at the platform 102. The mechanisms and manner of communication between the transmitting devices 350,354 and the computer system 440 are discussed further herein.

Those skilled in the art will readily recognize that several different sequences or patterns of RFID tags can be employed to communicate with the corresponding RFID readers in order to properly activate the exemplary telemetry tools disclosed herein. The exemplary sequences and patterns of RFID tags, and their related embodiments described herein, are merely by way of example and therefore should not be considered limiting to the scope of the disclosure. According to one or more embodiments, multiple RFID tags can be arranged in series at predetermined locations along the length of the completion string 128 and/or within each of one or more indicator collars 400. In such embodiments, the RFID readers can be programmed to detect a particular sequence or number of RFID tags before properly triggering the transmitting devices 350,354. As a result, several indicator collars 400 could be distributed along the completion string 128 and programmed to trigger the transmitting devices 350,354 in response to different or predetermined RED tag sequences.

In other embodiments, in order to provide identifying information, the completion string communications module 424 and the service tool communications module 442 can employ magnetic field sensing technology. More particularly, the completion string communications module 424 can include a configuration of one or more magnets having a distinct characteristic corresponding to a profile of the completion string communications module 424. The service tool communications module 442 of the service tool 138 can include a magnetic field sensing device (e.g., magnetometer). For example, inductive pickup coils of the service tool 138 can generate an electrical current as the service tool 138 travels past the magnets of a given indicator collar 400. The magnets of the completion string communications module 424 can be permanent magnets or electromagnets. For example, electromagnets of the completion string communications module 424 can be activated by the presence or approach of the service tool 138. Alternatively, electromagnets can be operated independent of the presence or approach of the service tool 138.

According to one or more embodiments, the completion string communications module 424 of the indicator collar 400 can provide a number of magnets distinct from the number of magnets of at least one other indicator collar 400 corresponding to a different sand screen 130. As the service tool 138 aligns with or approaches the indicator collar 400, the number of magnets detected by the service tool communications module 442 of the service tool 138 can be used to identify the detected indicator collar 400 and to distinguish it from some or all other indicator collars 400 corresponding to different sand screens 130.

According to one or more embodiments, the completion string communications module 424 of the indicator collar 400 can provide one or more magnets having a strength (e.g., producing a magnetic field of a certain magnitude) that is distinct from the strength of one or more magnets of at least one other indicator collar 400 corresponding to a different sand screen 130. As the service tool 138 aligns with or approaches the indicator collar 400, a magnitude or strength of a magnetic field can be detected by the service tool communications module 442 of the service tool 138 and used to identify the detected indicator collar 400 and to distinguish it from some or all other indicator collars 400 corresponding to different sand screens 130.

According to one or more embodiments, the completion string communications module 424 of the indicator collar 400 can provide a sequence of magnets having an arrangement of polarities that is distinct from the arrangement of magnets of at least one other indicator collar 400 corresponding to a different sand screen 130. For example, each magnet can have either a north end or a south and facing a given direction (e.g., toward the service tool communications module 442). The arrangement of polarities in a given sequence can be treated as a binary sequence that conveys a code that can be used for identifying information. As the service tool 138 aligns with or approaches the indicator collar 400, the sequence of polarities can be detected by the service tool communications module 442 of the service tool 138 and used to identify the detected indicator collar 400 and to distinguish it from some or all other indicator collars 400 corresponding to different sand screens 130.

According to one or more embodiments, in order to provide identifying information, the completion string communications module 424 and the service tool communications module 442 can employ ionizing radiation sensing technology. More particularly, the completion string communications module 424 can include a configuration of one or more radiation-emitting devices having a distinct characteristic corresponding to a profile of the completion string communications module 424, and the service tool communications module 442 can include an ionizing radiation sensing device (e.g., Geiger counter). For example, a radiation-emitting device can be embedded within the indicator collar 400 to detect radiation emitted from the completion string communications module 424.

The completion string communications module 424 can provide one or more devices emitting ionizing radiation that is distinct in at least one aspect with respect to emitting devices of at least one other indicator collar 400 corresponding to a different sand screen 130. The distinguishing characteristic can be a type of radiation (i.e., alpha, beta, or gamma), an activity level (i.e., intensity), or combinations thereof. As the service tool 138 aligns with or approaches the indicator collar 400, the characteristic can be detected by the service tool communications module 442 of the service tool 138 and used to identify the detected indicator collar 400 and to distinguish it from some or all other indicator collars 400 corresponding to different sand screens 130.

According to one or more embodiments, a pulser 312 can be provided to facilitate communication from the service tool 138 to the platform 102 (FIG. 1). The pulser 312 may carry the operating unit 344, which includes suitable electronics that stores data, relays the data to the transmitting device 350 (FIGS. 3A and 3B), and provides power for operation of the pulser 312. In this way, the information received by the service tool communications module 442 can be transmitted to the surface via the pulser 312. As will be described below, separate sensors may be provided and coupled to the pulser 312, for transmitting data relating to various downhole parameters to surface. The sensors may be provided in separate components in the service tool 138 and coupled to the pulser 312.

Figure 4A:
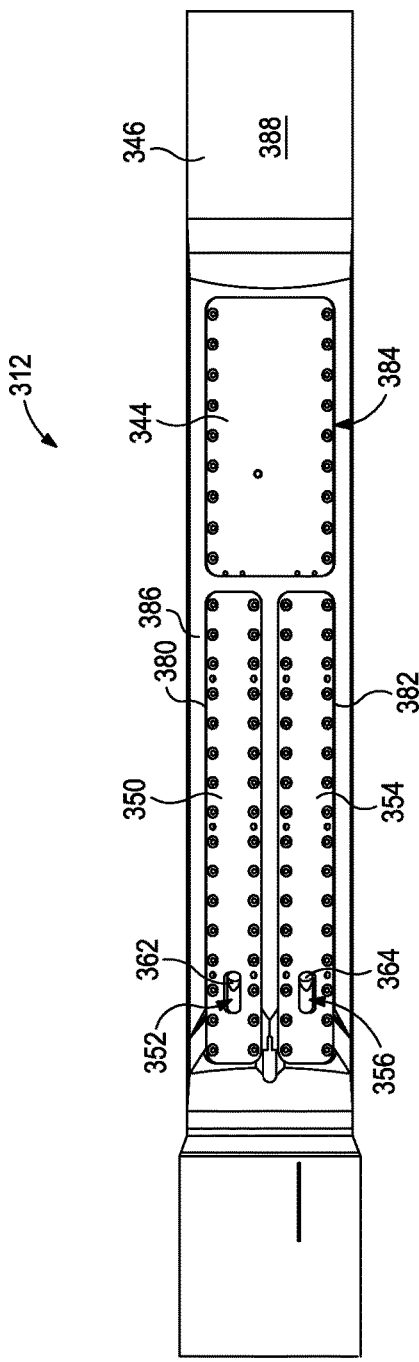
FIGS. 4A and 4B illustrate enlarged, detailed side and perspective views, respectively, of the apparatus shown in FIG. 2A.
Figure 4B:
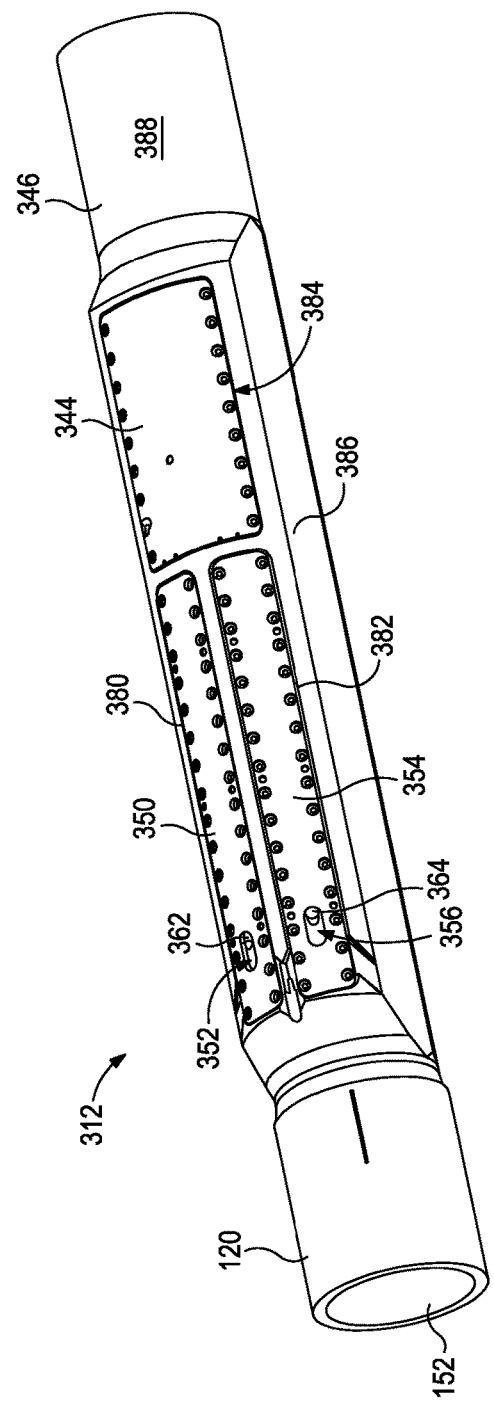

Referring now to FIGS. 4A and 4B, illustrated in an exemplary embodiment of the pulser 312, according to one or more embodiments. More particularly, FIG. 4A provides a side view of the pulser and FIG. 4B provides a perspective view of the pulser 312. As illustrated, the pulser 312 may include an elongate, generally tubular housing 346 that may be positioned along the work string 120 (FIG. 1). A first pulse generating device 350 is mounted in the housing 346, and serves for controlling the flow of fluid along a first flow path 352 which communicates with the internal fluid flow passage 152, to generate a first fluid pressure pulse. A second pulse generating device 354 may be similarly mounted in the housing 346, and serves for controlling the flow of fluid along a second flow path 356 which also communicates with the internal fluid flow passage 152, to generate a second fluid pressure pulse. Only part of the flow paths 352 and 356 are shown in FIGS. 4A and 4B.

The first and second devices 350 and 354 can be arranged to operate in a number of operating conditions. In one operating condition, for instance, the first and second devices 350 and 354 are arranged to operate such that the fluid pressure pulse generated by the pulser 312 is a combination of the first and second fluid pressure pulses generated by the first and second devices. Arrangement of the devices 350 and 354 so that the pulses they generate match, is such that the pulses complement and/or reinforce one-another. The pulses generated by the devices 350 and 354 match in that they have the same profiles. In this way, the pulse outputted by the pulser 312 has a magnitude (or amplitude) which is the sum of the magnitudes of the individual pulses generated by the first and second devices 350 and 354. This may prove advantageous particularly in larger diameter tubing and deep wells, where pulses that are of insufficient magnitude or suffer significant attenuation are difficult to detect at surface.

In another operating condition, the second device 354 can be arranged so that it is operated independently of the first device 350 and in the event of failure of the first device 350. This provides a degree of redundancy in the event of failure of the first device 350, without requiring the entire pulser 312 to be pulled out of the wellbore 122 and returned to surface for repair.

In another operating condition, the first and second devices 350 and 354 can be arranged so that they are used to transmit pressure pulses to surface representative of different data, such as relating to a position of the service tool 138 in relation to one or more indicator collars 400, each corresponding to a sand screen 130. Other parameters, such as pressure, temperature, WOB, TOB, stress or strain in wellbore tubing or data relating to geological features, can also be measured and communicated. When operated in this way, the devices 350 and 354 will be activated separately so that the pulses generated do not overlap. This will ensure that the two pressure pulse signals can be distinguished at surface. By way of example, the first device 350 may operate to generate a pulse of a first duration to transmit the data and then be deactivated. The second device 354 may then be operated to generate a pulse of a second duration and then be deactivated. Further pulses can be sent as appropriate.

In another operating condition, the first and second devices 350 and 354 can be arranged so that they are used to transmit pressure pulses to surface representative of the same data, but transmitted using different pulse profiles or signatures (pressure v. time). This may provide an ability to take account of particular operating conditions in the well affecting pulse transmission. For example, operating conditions including wellbore temperature and pressure, the density and/or viscosity of fluids in the wellbore-lining tubing, and the presence of solids materials such as drill cuttings, may impact the transmission of fluid pressure pulses to surface. A pulse of a different duration and/or amplitude may be more easily transmitted (and so detected at surface) depending upon these operating conditions. Thus, the data to be transmitted by the pulser 312 can effectively be transmitted in more than one different way. Again, when operated in this way, the devices 350 and 354 will be activated separately so that the pulses generated do not overlap. This will ensure that the two pressure pulse signals can be distinguished at surface.

Figure 4C:
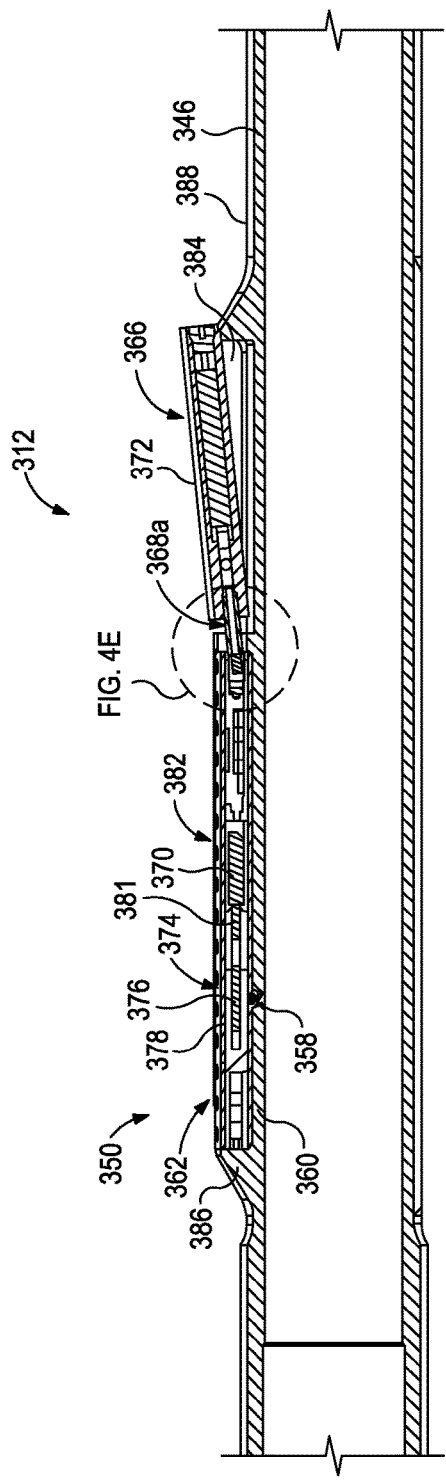
FIG. 4C illustrates an enlarged, detailed view of the apparatus shown in FIG. 2A.
Figure 4E:
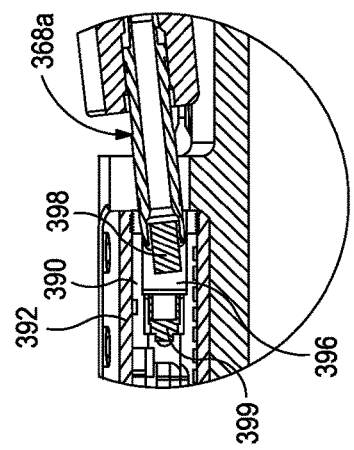
FIG. 4E illustrates a further enlarged view of another part of the apparatus shown in FIG. 4C.
Figure 4D:
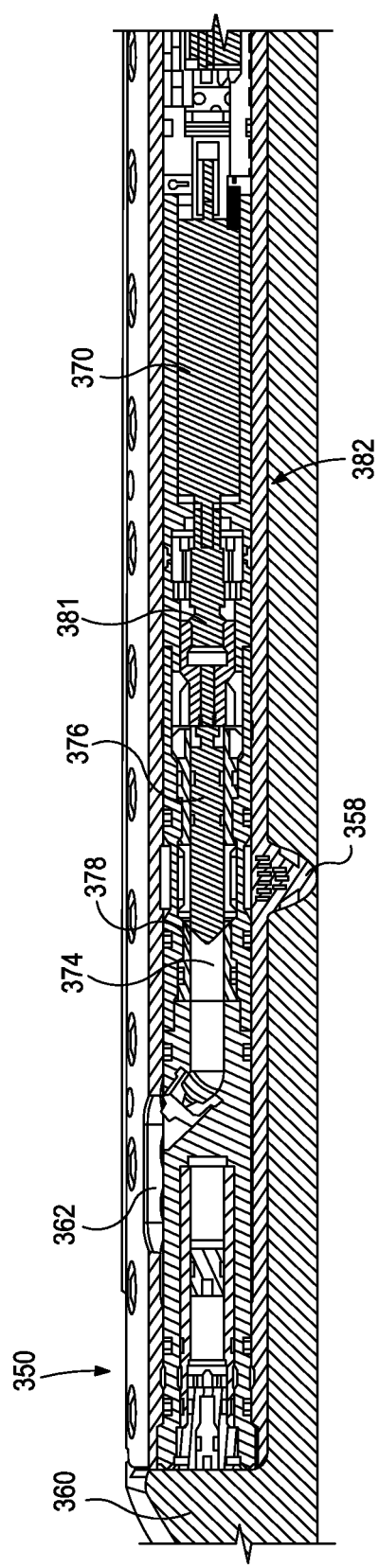
FIG. 4D illustrates a further enlarged view of part of the apparatus shown in FIG. 4C.

FIG. 4C provides a cross-sectional side view of the pulser 312, FIG. 4D depicts an enlarged view of a portion of the pulser 312, and FIG. 4E depicts an enlarged view of the pulser 312 as indicated in FIG. 4C. As can be seen, the devices 350 and 354 do not take up significant space downhole, and do not impede the internal flow passage 152 (FIGS. 2A and 2B). As a result, the pulser 312 does not obstruct the internal flow passage 152, thereby allowing maximized fluid flow or providing unobstructed access for additional downhole tools. The devices 350 and 354 do not take up as much space, at least taken terms of their radial width, as a single device performing the same function would do. In this way, a pulse of a magnitude which is sufficient to be detected at surface can be generated without requiring the use of a larger pulse generating device, which might otherwise impede the internal flow passage 152.

Figure 4F:
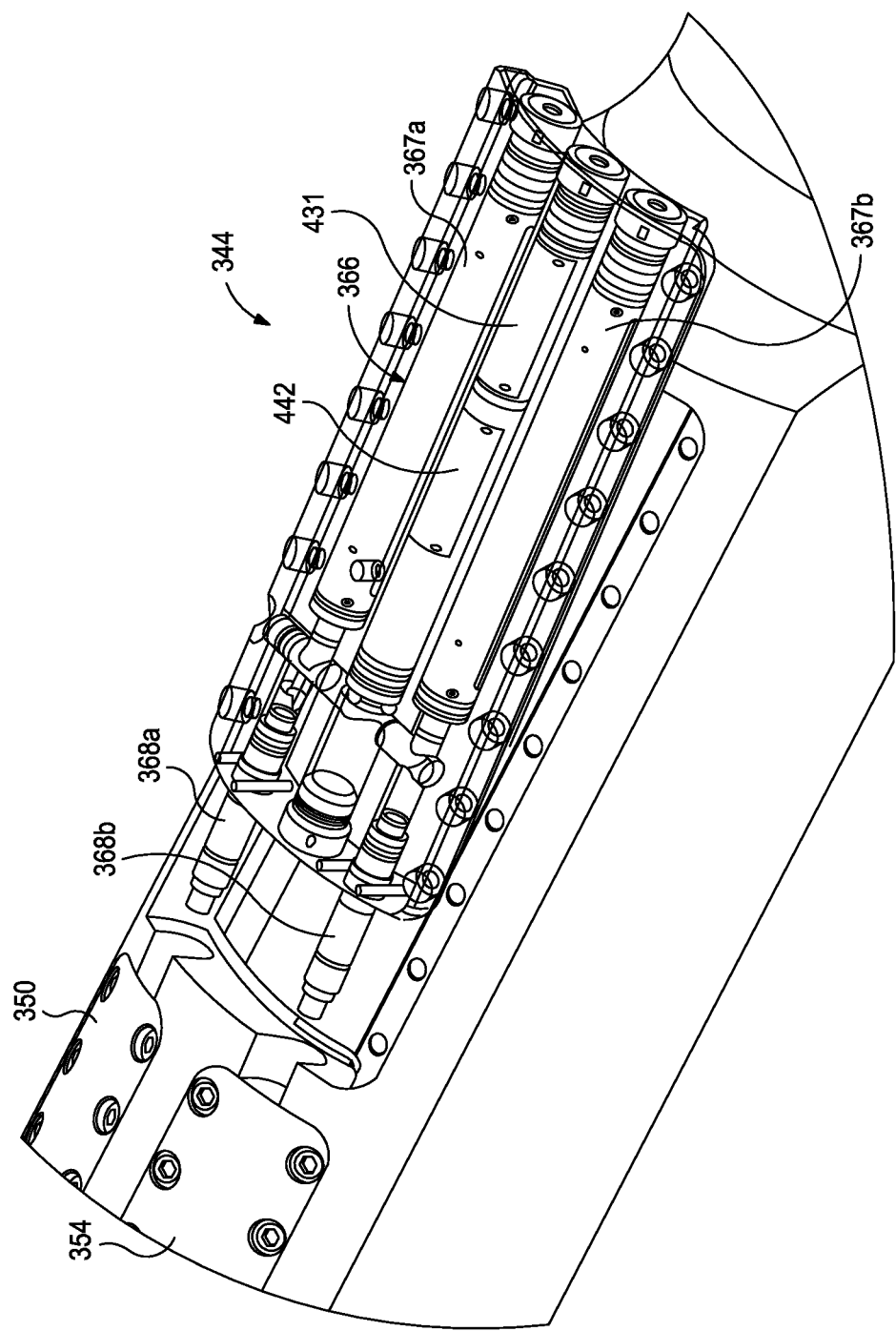
FIG. 4F illustrates a further enlarged perspective view of part of the apparatus shown in FIG. 4C, with certain internal components shown in ghost outline.

The pulser 312 and its method of operation will now be described in more detail. As discussed above, the pulser 312 includes the operating unit 344, which is arranged to operate the first and second devices 350 and 354 simultaneously or individually, as required. The operating unit 344 is shown in more detail in FIG. 4F, which is a further enlarged perspective view of part of the pulser 312 shown in FIG. 4C, with certain internal components shown in ghost outline and showing the operating unit 344 during insertion into the housing 346. The operating unit 344 includes an electronics section 366, which includes the transmitting module 431, the service tool communications module 442, first and second electrical power sources in the form of batteries 367a and 367b, first and second electrical connector elements 368a, 368b and a suitable data storage device (not shown). The batteries 367a and 367b provide power for actuation of the devices 431, 442, 350 and 354, although a single battery may be utilized. The connector elements 367a, 367b provide electrical connection with the devices 350 and 354 so that they can be operated to transmit data relating to information received by the service tool communications module 442 to surface.

With reference to FIG. 4D, the first and second devices 350 and 354 (only the first device 350 shown) may each include a valve, one of which is shown and given the reference numeral 374. The valves 374 include a valve element 376 and a valve seat 378, the valves being actuable to control the flow of fluid along the respective flow paths 352, 356. This is achieved by moving the respective valve elements 376 into or out of sealing abutment with the valve seats 378. The devices 350 and 354 also each include respective actuators 370 coupled to the valve elements 376, to thereby control the flow of fluid through the respective flow paths 352, 356. The actuators 370 are electrically operated, and take the form of solenoids or motors having shaft linkages 381. The actuator shaft linkages 381 are coupled to the valve elements 376 to control their movement, and provide linear or rotary inputs for operation of the valve elements, the latter being via a suitable rotary to linear converter.

Power for operation of the actuators 370 is provided by the battery packs 367*a*, 367*b* via the connector elements 368*a*, 368*b*. As shown in FIG. 4E, the connector elements 368 are located within seal bore assemblies 390 mounted within bores 392 of the devices 350, 354. Ends 398 of the connector elements 368*a*, 368*b* make electrical connection with sockets 399, which transmit power to the actuators 370. Operation of the actuators 370 causes the actuator shaft linkage 381 to translate the valve elements 376 out of sealing engagement with the valve seat 378. When it is desired to return the valves 374 to their closed positions, the actuators 370 are deactivated and return springs (not shown) urge the valve elements 376 back into sealing abutment with their valve seats 378.

The structure and operation of both the valves 374 and actuators 366 are in most respects similar to that disclosed in WO-2011/004180. Accordingly, these components will not be described in further detail herein.

Referring again to FIGS. 4A and 4B, the first and second devices 350 and 354 are mounted in respective spaces 380 and 382 provided in the wall 360 of the tubular housing 346. The operating unit 344 is similarly mounted in a space 384 the housing wall 360, which is separate from the spaces 380, 382 in which the first and second devices 350, 354 are mounted but which opens on to them. As shown, the devices 350, 354 and the operating unit 344 are mounted entirely within the respective spaces 380, 382 and 384. The spaces 380, 382 and 384 have openings, which are on or in an external surface of the housing, facilitating insertion of the device 350, 354 and the operating unit 344 into the spaces. The tubular housing 346 defines an upset or shoulder 386, which is upstanding from a circumferential outer surface 388 of the housing, and which define the spaces 380, 382 and 384. This facilitates provision of an internal passage 152 of unrestricted diameter extending along the length of the housing 346, e.g. for the passage of tools or tubing downhole past the pulser 312.

The first and second devices 350, 354 and the operating unit 344 are in the form of cartridges or inserts, which can be releasably mounted in the tubular housing, in the spaces 380, 382 and 384, respectively. The cartridges of the first and second devices 350, 354 and operating unit 344 are shaped so that they are entirely mounted within the respective spaces 380, 382 and 384. The cartridges of the first and second devices 350, 354 house the respective valves 374. The first and second devices 350 and 354 also define part of the respective flow paths 352 and 356, the flow paths extending from the inlets 358 in the housing wall 360, through the valves 374 to the outlets 362 and 364. Operation of the valves 374 thereby controls the flow of fluid along the flow paths 352, 356 from the inlets 358 to the respective outlets 352, 356 to generate pulses. Positive or negative fluid pressure pulses may be generated by the devices 350, 354. Positive pulses are generated by operating the devices 350, 354 to close the respective flow paths 352, 356, and negative pulses by operating the devices to open the flow paths (as described above).

In use, the generation of fluid pressure pulses may be achieved without restricting a bore of the primary fluid flow passage, particularly where the outlets 362, 364 open to the exterior of the housing 346. The generation of positive or negative pulses may be controlled by appropriate direction of fluid to an exterior of the housing 346, or back into the internal flow passage 152. The direction of fluid back into the internal flow passage 152 may require the existence of a restriction (not shown) in the fluid flow passage 152.

According to one or more embodiments, activity of the pulser 312 continues until, or can cease after, transmitting at least one signal that the service tool 138 is on depth with the completion string 128. Accordingly, the pulser 312 can continually or periodically transmit position information as the service tool 138 is aligned with the completion string 128. Alternatively or in combination, activity of the pulser 312 continues until, or can cease after, a gravel pack operation is commenced. Such an operation can be detected based on wellbore conditions sensed by the operating unit 344. Accordingly, the pulser 312 can continually or periodically transmit position information until a user controllably commences a gravel pack operation.

Embodiments disclosed herein include:

A. A method, including: extending a service tool within a completion string adjacent to a target formation; extending a service tool within a completion string adjacent to a target formation, wherein a reader is positioned on one of the service tool and the completion string, and a tag is positioned on the other of the service tool and the completion string; positioning the reader within a threshold distance of the tag to receive an indicator from the tag; receiving, at the reader, the indicator indicating that an internal fluid flow passage of the service tool is in fluid communication with the target formation and that the target formation is not in fluid communication with a return conduit; transmitting a signal corresponding to the indicator from a pulser to a surface location; and pumping a fluid slurry through the internal fluid flow passage to the target formation.

B. A service tool, including: an internal fluid flow passage for delivering a fluid slurry to a target formation; a return port selectively providing fluid communication between the target formation and a return conduit; one of a reader and a tag, the tag being configured to transmit an indicator and the reader being configured to receive the indicator the indicator representing a characteristic of the indicator collar or the service tool, wherein the other of the reader and the tag is positioned on a completion string; a pulser configured to transmit a signal, corresponding to the indicator, to a surface location; wherein, when the service tool is in an aligned position with respect to the completion string, the service tool prevents fluid communication between the target formation and a return conduit and the reader is within a threshold distance from the tag to receive the indicator.

C. A well system, including: a completion string adjacent to a target formation and including: an indicator collar having one of a reader and a tag; a service tool extending within the completion string, the service tool including: an internal fluid flow passage for delivering a fluid slurry to the target formation; a return port selectively providing fluid communication between the target formation and a return conduit; the other of the reader and the tag, the tag being configured to transmit an indicator representing a characteristic of the indicator collar or the service tool, the reader being configured to receive the indicator from the tag; and a pulser configured to transmit a signal, corresponding to the indicator, to a surface location; wherein, when the service tool is in an aligned position with respect to the completion string, the service tool prevents fluid communication between the target formation and a return conduit and the reader is within a threshold distance from the tag to receive the indicator.

Each of embodiments A, B, and C may have one or more of the following additional elements in any combination:

Element 1: the tag can include a radio frequency identification tag. Element 2: the tag can include an ionizing radiation-emitting device. Element 3: the tag can include one or more magnets. Element 4: the reader can be activated via an activation command from the surface location. Element 5: a deactivation command can be transmitted from the surface location to the pulser to cease transmission of the signal. Element 6: energy from a transmitting module of the service tool can be transmitted to the tag. Element 7: the reader can be positioned within a threshold distance of an additional tag positioned on one of the service tool and the completion string to receive an additional indicator from the additional tag. Element 8: the additional indicator can be received at the reader, the additional indicator indicating that the internal fluid flow passage of the service tool is in fluid communication with an additional target formation and that the additional target formation is not in fluid communication with the return conduit. Element 9: an additional signal corresponding to the additional indicator can be transmitted from the pulser to the surface location. Element 10: an additional fluid slurry can be pumped through the internal fluid flow passage to the additional target formation. Element 11: when the service tool is in the aligned position with respect to the completion string, the fluid slurry can be provided with at least one flow pathway from the target formation to the return conduit that does not pass through the pulser. Element 12: the service tool further can include a transmitting module configured to transmit energy to the tag. Element 13: when the service tool is in the aligned position with respect to the completion string, the fluid slurry can be provided with at least one flow pathway from the target formation to the return conduit that does not pass through the pulser. Element 14: the completion string can include an additional tag configured to transmit an additional indicator, the additional indicator indicating that (i) the internal fluid flow passage of the service tool is in fluid communication with an additional target formation and (ii) the additional target formation is not in fluid communication with the return conduit. Element 15: a system at the surface location can be configured to transmit an activation command from the surface location to the reader to commence operation of the reader. Element 16: a system at the surface location can be configured to transmit a deactivation command from the surface location to the pulser to cease transmission of the signal. Element 17: a transmitting module can be configured to transmit energy to the tag.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A method, comprising:
extending a service tool within a completion string adjacent to a target formation;
extending a service tool within a completion string adjacent to a target formation, wherein a reader is positioned on one of the service tool and the completion string, and a tag is positioned on the other of the service tool and the completion string;
positioning the reader within a threshold distance of the tag to receive an indicator from the tag;
receiving, at the reader, the indicator indicating that an internal fluid flow passage of the service tool is in fluid communication with the target formation and that the target formation is not in fluid communication with a return conduit;
transmitting a signal corresponding to the indicator from a pulser to a surface location; and
pumping a fluid slurry through the internal fluid flow passage to the target formation.

2. The method of claim 1, wherein the tag comprises a radio frequency identification tag.

3. The method of claim 1, wherein the tag comprises an ionizing radiation-emitting device.

4. The method of claim 1, wherein the tag comprises one or more magnets.

5. The method of claim 1, wherein receiving, at the reader, the indicator comprises activating the reader via an activation command from the surface location.

6. The method of claim 1, further comprising transmitting a deactivation command from the surface location to the pulser to cease transmission of the signal.

7. The method of claim 1, further comprising transmitting energy from a transmitting module of the service tool to the tag.

8. The method of claim 1, further comprising:
positioning the reader within a threshold distance of an additional tag positioned on one of the service tool and the completion string to receive an additional indicator from the additional tag;
receiving, at the reader, the additional indicator, the additional indicator indicating that the internal fluid flow passage of the service tool is in fluid communication with an additional target formation and that the additional target formation is not in fluid communication with the return conduit;
transmitting an additional signal corresponding to the additional indicator from the pulser to the surface location; and
pumping an additional fluid slurry through the internal fluid flow passage to the additional target formation.

9. A service tool, comprising:
an internal fluid flow passage for delivering a fluid slurry to a target formation;
a return port selectively providing fluid communication between the target formation and a return conduit;
one of a reader and a tag, the tag being configured to transmit an indicator and the reader being configured to receive the indicator the indicator representing a characteristic of a collar of the indicator or the service tool, wherein the other of the reader and the tag is positioned on a completion string;
a pulser configured to transmit a signal, corresponding to the indicator, to a surface location;
wherein, when the service tool is in an aligned position with respect to the completion string, the service tool prevents fluid communication between the target formation and a return conduit and the reader is within a threshold distance from the tag to receive the indicator.

10. The service tool of claim 9, wherein, when the service tool is in the aligned position with respect to the completion string, the fluid slurry is provided with at least one flow pathway from the target formation to the return conduit that does not pass through the pulser.

11. The service tool of claim 9, wherein the service tool further comprises a transmitting module configured to transmit energy to the tag.

12. A well system, comprising:
a completion string adjacent to a target formation and comprising:
an indicator collar having one of a reader and a tag;
a service tool extending within the completion string, the service tool comprising:
an internal fluid flow passage for delivering a fluid slurry to the target formation;
a return port selectively providing fluid communication between the target formation and a return conduit;
the other of the reader and the tag, the tag being configured to transmit an indicator representing a characteristic of the indicator collar or the service tool, the reader being configured to receive the indicator from the tag; and
a pulser configured to transmit a signal, corresponding to the indicator, to a surface location;
wherein, when the service tool is in an aligned position with respect to the completion string, the service tool prevents fluid communication between the target formation and a return conduit and the reader is within a threshold distance from the tag to receive the indicator.

13. The well system of claim 12, wherein the tag comprises a radio frequency identification tag.

14. The well system of claim 12, wherein the tag comprises an ionizing radiation-emitting device.

15. The well system of claim 12, wherein the tag comprises one or more magnets.

16. The well system of claim 12, wherein, when the service tool is in the aligned position with respect to the completion string, the fluid slurry is provided with at least one flow pathway from the target formation to the return conduit that does not pass through the pulser.

17. The well system of claim 12, wherein the completion string further comprises an additional tag configured to transmit an additional indicator, the additional indicator indicating that (i) the internal fluid flow passage of the service tool is in fluid communication with an additional target formation and (ii) the additional target formation is not in fluid communication with the return conduit.

18. The well system of claim 12, further comprising a system at the surface location that is configured to transmit an activation command from the surface location to the reader to commence operation of the reader.

19. The well system of claim 12, further comprising a system at the surface location that is configured to transmit a deactivation command from the surface location to the pulser to cease transmission of the signal.

20. The well system of claim 12, wherein the service tool further comprises a transmitting module configured to transmit energy to the tag.

* * * * *